US012726074B2

(12) United States Patent
Matsuo et al.

(10) Patent No.: US 12,726,074 B2
(45) Date of Patent: Sep. 1, 2026

(54) DRIVE DEVICE

(71) Applicant: DENSO CORPORATION, Kariya-city (JP)

(72) Inventors: Yasufumi Matsuo, Kariya-city (JP); Tomoaki Yoshimi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 216 days.

(21) Appl. No.: 18/467,718

(22) Filed: Sep. 14, 2023

(65) Prior Publication Data

US 2024/0006954 A1 Jan. 4, 2024

Related U.S. Application Data

(63) Continuation of application No. PCT/JP2022/010102, filed on Mar. 8, 2022.

(30) Foreign Application Priority Data

Mar. 18, 2021 (JP) ................................ 2021-045039

(51) Int. Cl.
*H02K 5/22* (2006.01)
*H02K 11/00* (2016.01)

(52) U.S. Cl.
CPC ......... *H02K 5/225* (2013.01); *H02K 11/0094* (2013.01); *H02K 2211/03* (2013.01)

(58) Field of Classification Search
CPC ............... H02K 5/225; H02K 11/0094; H02K 2211/03; H02K 9/22; H02K 11/33; B62D 5/04
See application file for complete search history.

(56) References Cited

U.S. PATENT DOCUMENTS

2012/0161590 A1* 6/2012 Yamasaki ............. H02K 11/33 310/68 B
2015/0115754 A1* 4/2015 Yamasaki ................ H02K 5/04 310/71
2016/0134170 A1 5/2016 Park
2018/0093698 A1 4/2018 Urimoto et al.
2019/0312491 A1 10/2019 Yamamoto
2021/0111609 A1* 4/2021 Sato ......................... H02K 9/22
2021/0339794 A1* 11/2021 Kawaguchi ............ H02K 5/225
2022/0385144 A1 12/2022 Saitou et al.

* cited by examiner

*Primary Examiner* — Christopher M Koehler
*Assistant Examiner* — Riley Owen Stout
(74) *Attorney, Agent, or Firm* — Precision Patents, P.C.

(57) ABSTRACT

A motor case of a motor has a cylindrical portion. A motor frame is provided on one side of the cylindrical portion in an axial direction. A control unit has at least one board and a connector unit and is arranged on one axial side of the motor. The connector unit has at least one connector erected from the base portion with a frontage facing outward in the axial direction of the motor. An extension member is secured to the motor case. A cover having a hole through which the connector is inserted and fixed to the extension member. The extension member is formed to extend to an outside of a projected area in which the cylindrical portion of the motor case is projected in an axial direction.

9 Claims, 12 Drawing Sheets

78
72
74
71
70

DRIVE DEVICE

CROSS REFERENCE TO RELATED APPLICATIONS

This application is a continuation application of International Patent Application No. PCT/JP2022/010102 filed on Mar. 8, 2022, which designated the U.S. and based on and claims the benefits of priority of Japanese Patent Application No. 2021-045039 filed on Mar. 18, 2021. The entire disclosure of all of the above applications is incorporated herein by reference.

TECHNICAL FIELD

The present disclosure relates to a drive device.

BACKGROUND

Conventionally, a drive device in which a motor and a control unit are integrally formed is known.

SUMMARY

A drive device of the present disclosure includes a motor, a motor frame, a control unit, an extension member and a cover. The motor includes a motor case having a cylindrical portion, a stator fixed to the motor case, a motor winding wound around the stator, a rotor provided rotatably relative to the stator, and a shaft that rotates integrally with the rotor. The motor frame is provided on one side of the cylindrical portion in the axial direction.

A control unit has at least one board and a connector unit and is arranged on one axial side of the motor. On the board, an electronic component related to control of energization to the motor winding is mounted. The connector unit has at least one connector erected from a base portion with a frontage facing outward in an axial direction of the motor. An extension member is fixed to the motor case. A cover has a hole through which the connector is inserted, and is fixed to the extension member. the extension member is formed to extend to an outside of a projection area obtained by projecting the cylindrical portion of the motor case in the axial direction.

BRIEF DESCRIPTION OF THE DRAWINGS

The above and other objects, features and advantages of the present disclosure will become more apparent from the following detailed description made with reference to the accompanying drawings.

In the drawings.

DETAILED DESCRIPTION

In an assumable example, a drive device in which a motor and a control unit are integrally formed is known. For example, a housing integrally formed with a connector is fixed to a surface in an axial direction of a frame by means of screws or the like.

However, when a connector-integrated housing is fixed to a frame that is fitted radially inward of a motor case, it is necessary to keep a connector opening and a circuit board placed in a space formed between the frame and the housing within a diameter size of the motor. An object of the present disclosure is to provide a drive device capable of improving the degree of design freedom.

A drive device of the present disclosure includes a motor, a motor frame, a control unit, an extension member and a cover. The motor includes a motor case having a cylindrical portion, a stator fixed to the motor case, a motor winding wound around the stator, a rotor provided rotatably relative to the stator, and a shaft that rotates integrally with the rotor. The motor frame is provided on one side of the cylindrical portion in the axial direction.

A control unit has at least one board and a connector unit and is arranged on one axial side of the motor. On the board, an electronic component related to control of energization to the motor winding is mounted. The connector unit has at least one connector erected from a base portion with a frontage facing outward in an axial direction of the motor. An extension member is fixed to the motor case. A cover has a hole through which the connector is inserted, and is fixed to the extension member. the extension member is formed to extend to an outside of a projection area obtained by projecting the cylindrical portion of the motor case in the axial direction.

As a result, the control unit can be expanded to the outside of the projected area of the cylindrical portion of the motor case, so that the mounting area of the board and the frontage area of the connector unit can be secured, and the degree of freedom in design can be increased.

First Embodiment

A drive device will be described below with reference to the drawings. Hereinafter, in a plurality of embodiments, a substantially equivalent configuration will be denoted by an identical reference, and explanation thereof will be omitted. The drive device according to a first embodiment is shown in FIGS. 1 to 14.

Figure 1:
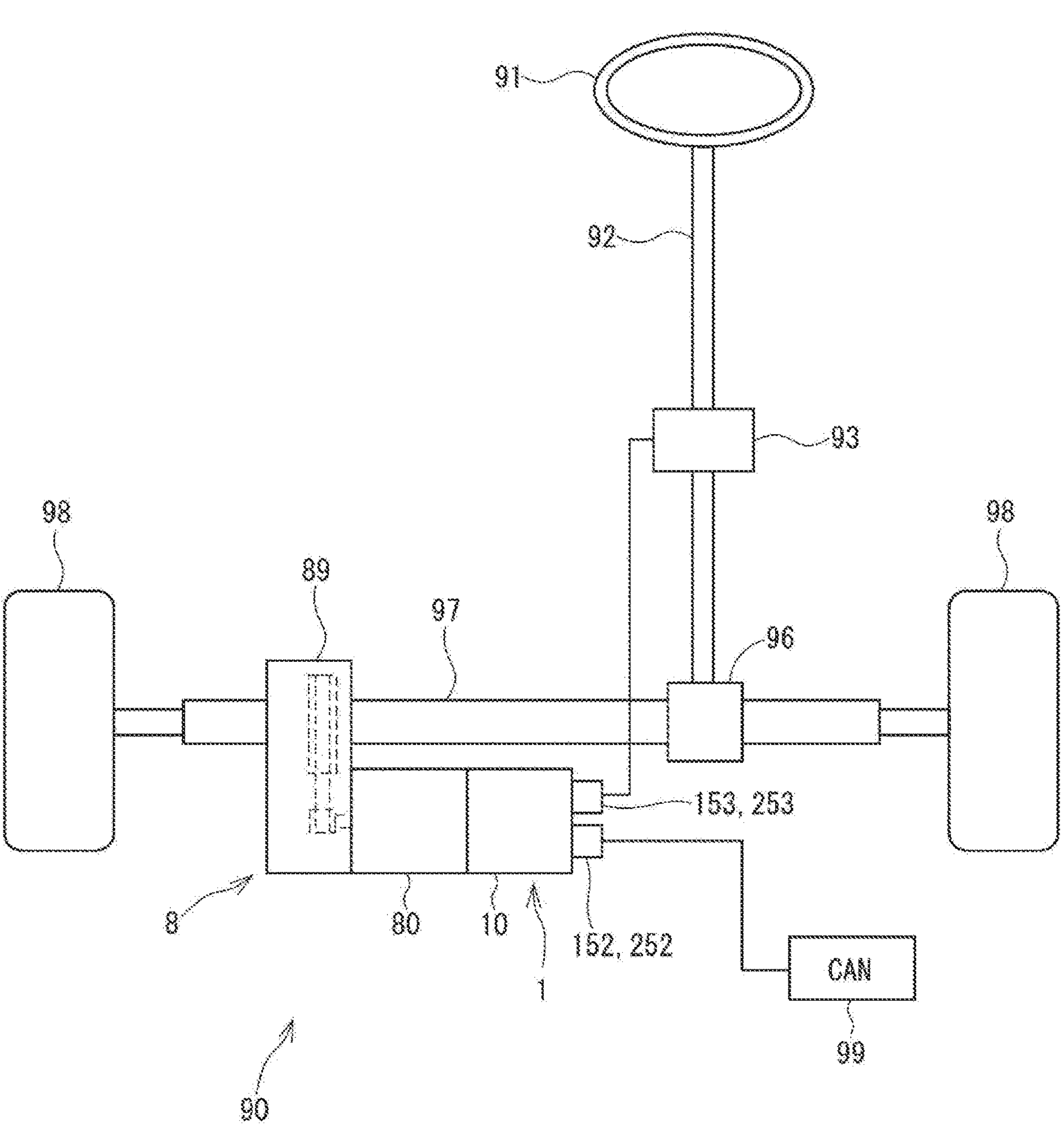
FIG. 1 is a schematic structural view illustrating a steering system according to a first embodiment.
Figure 2:
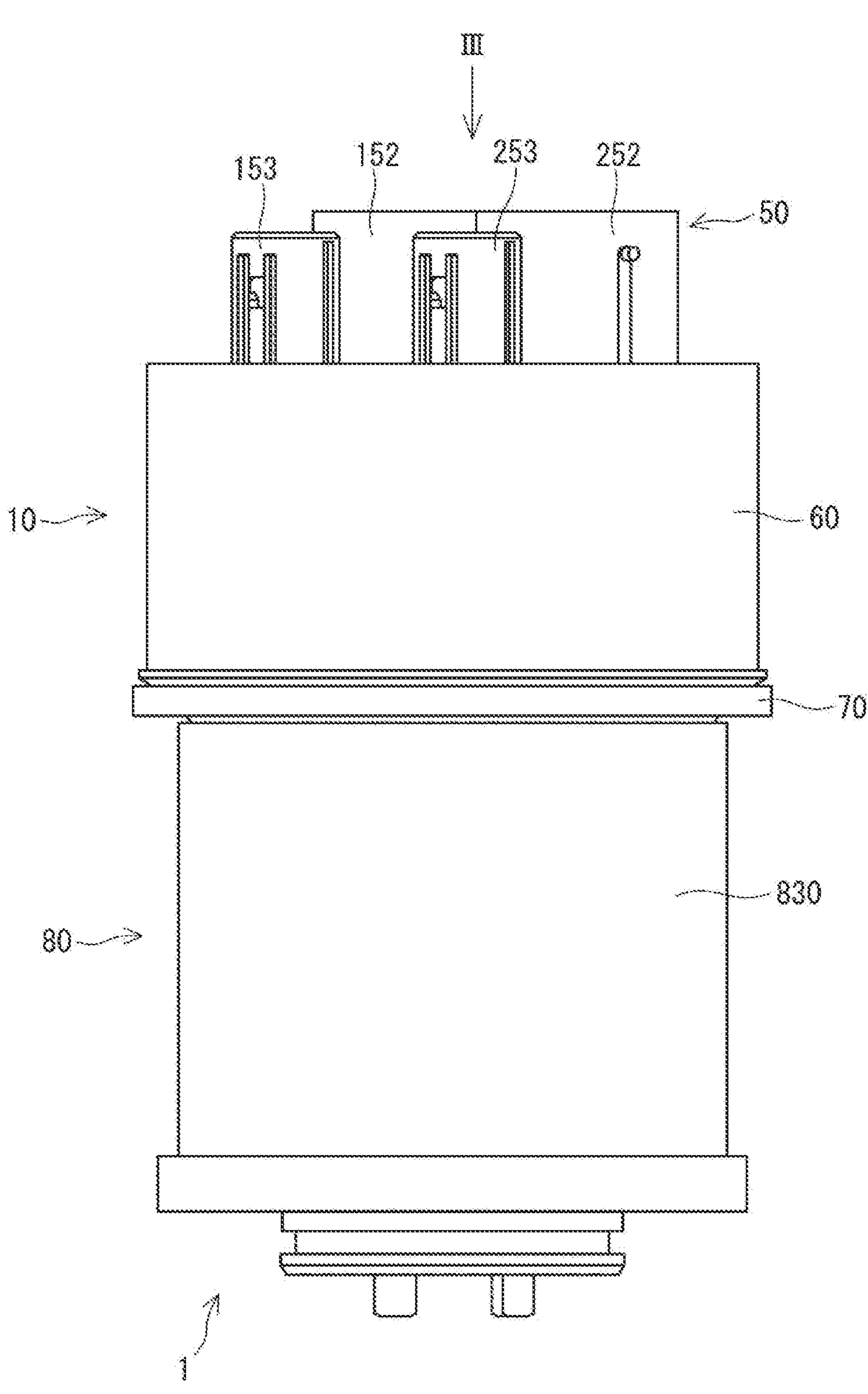
FIG. 2 is a side view showing a drive device according to the first embodiment.
Figure 3:
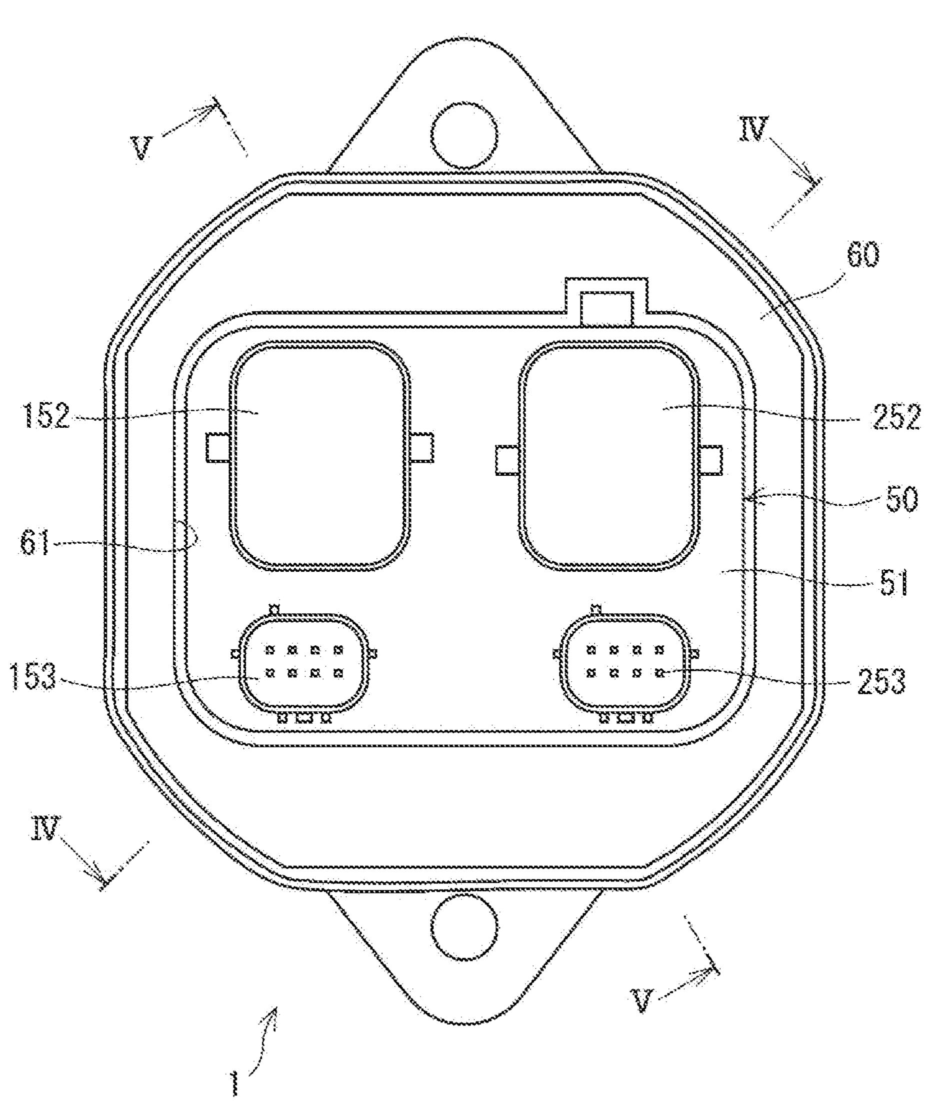
FIG. 3 is a diagram seen from a direction of an arrow III in FIG. 2.
Figure 4:
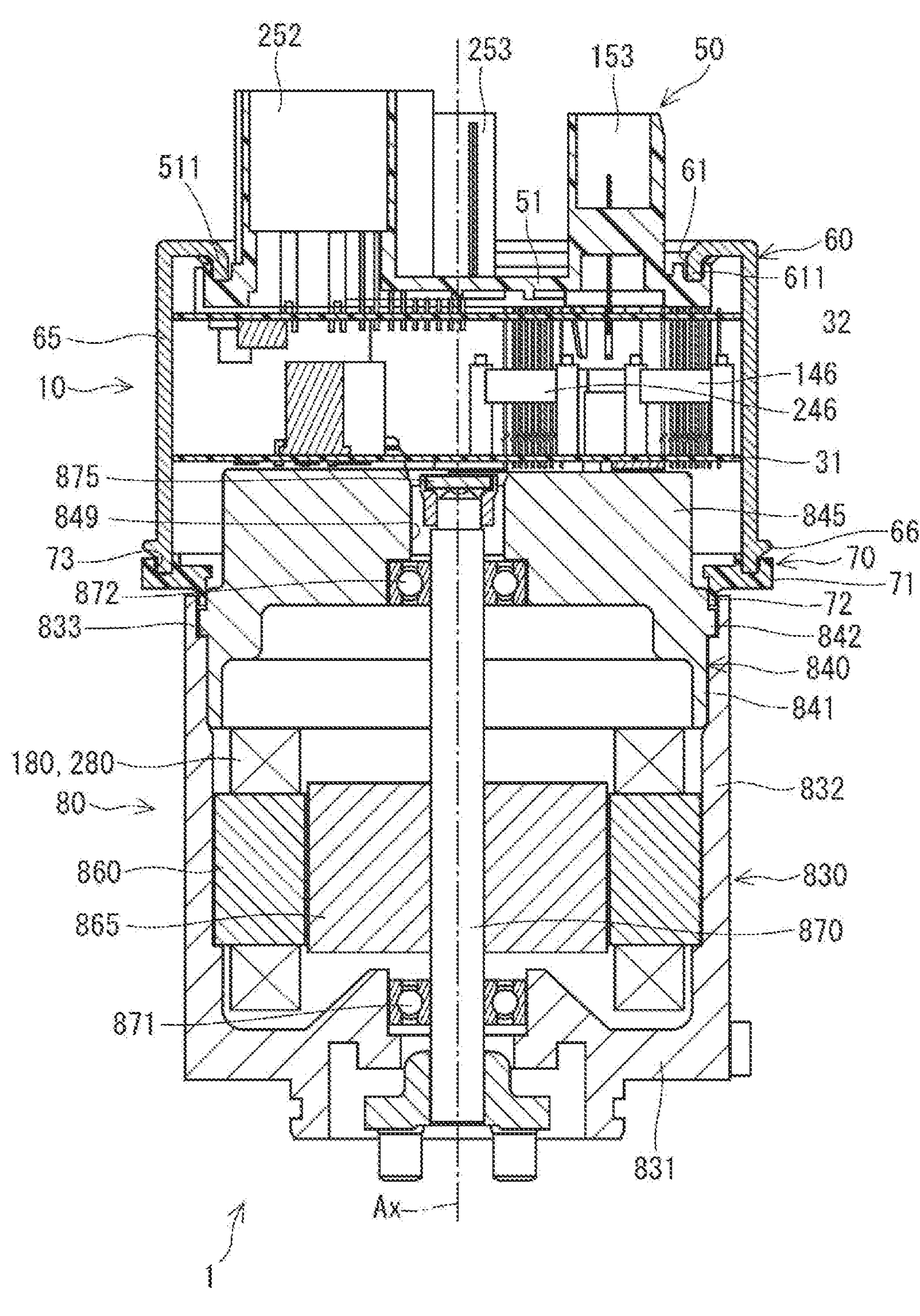
FIG. 4 is a cross-sectional view taken along line IV-IV of FIG. 3.
Figure 5:
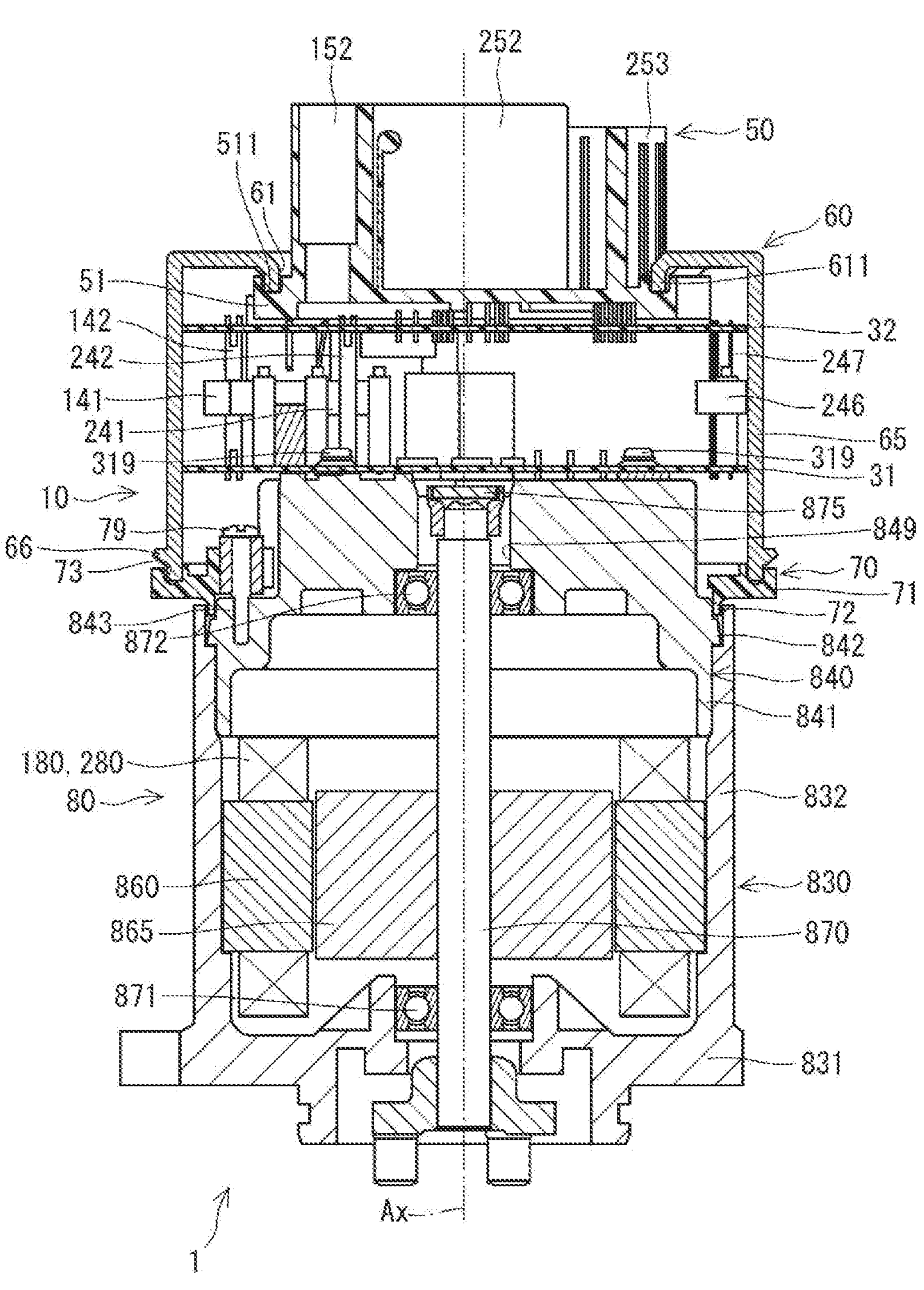
FIG. 5 is a cross sectional view taken along a line V-V of FIG. 3.
Figure 6:
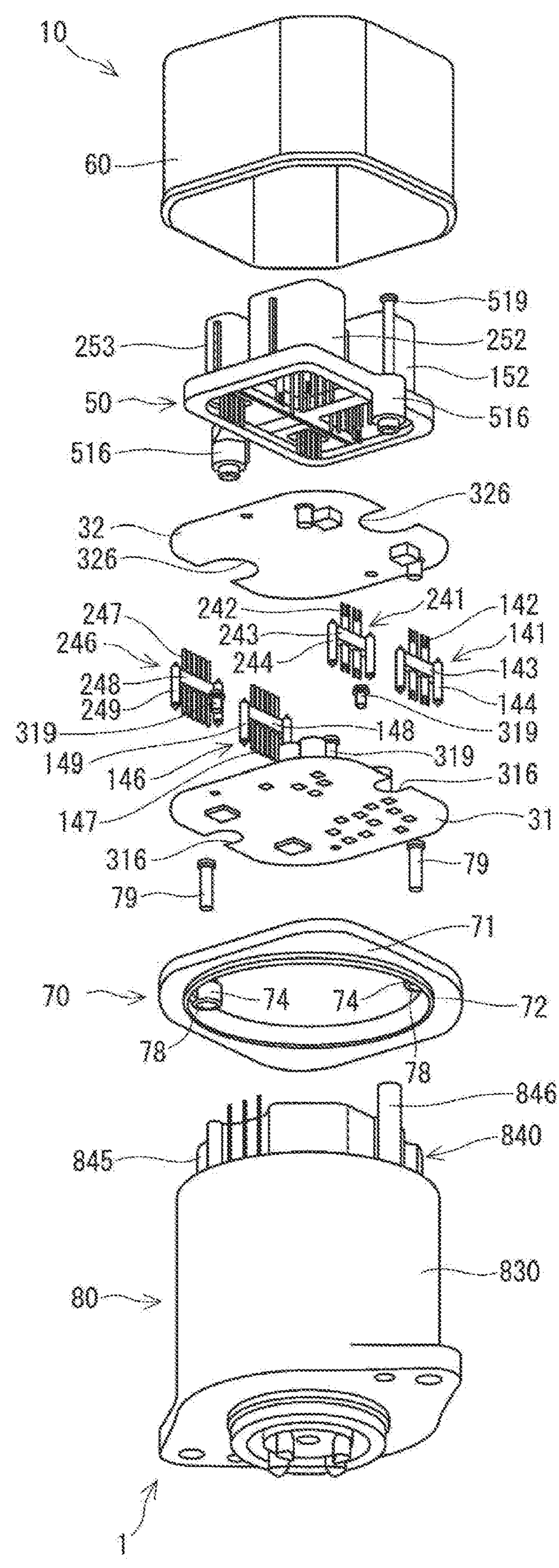
FIG. 6 is an exploded perspective view of the drive device according to the first embodiment.
Figure 7:
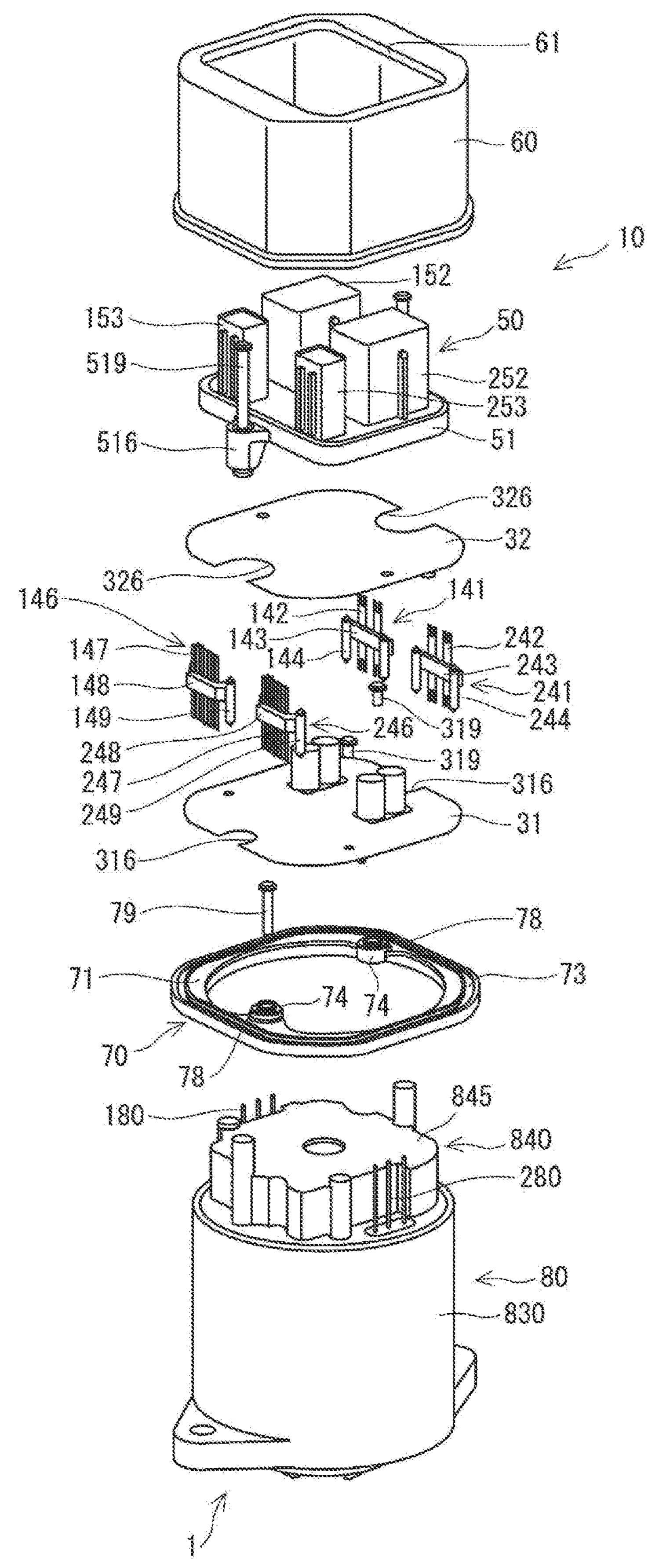
FIG. 7 is an exploded perspective view of the drive device according to the first embodiment.
Figures 8, 9:
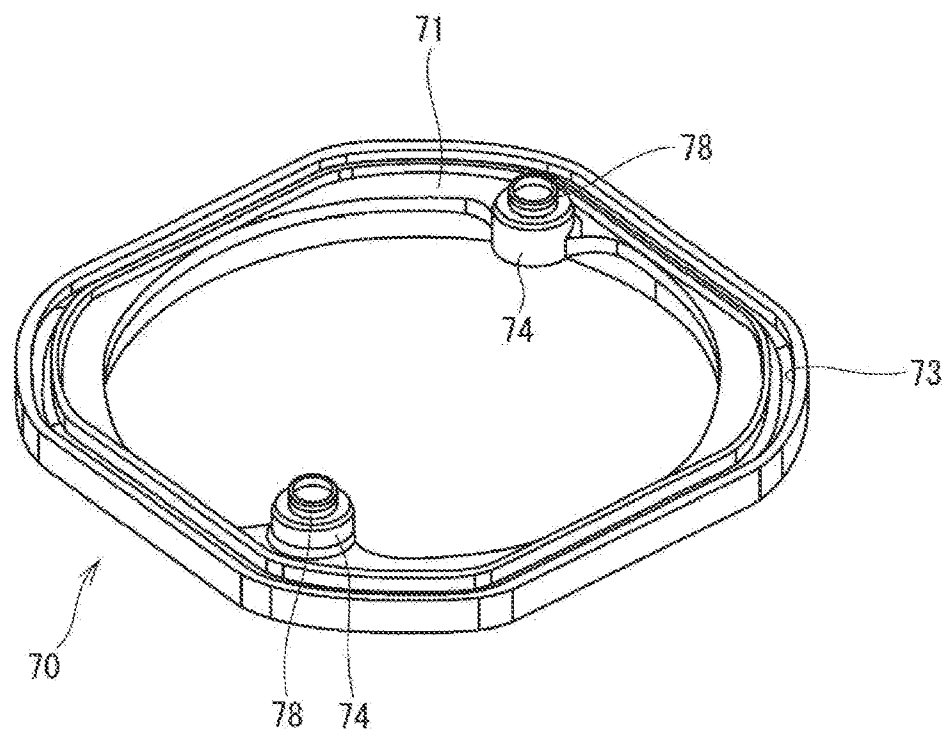
FIG. 8 is a perspective view of an extension member according to the first embodiment.
FIG. 9 is a perspective view of an extension member according to the first embodiment.
Figure 10:
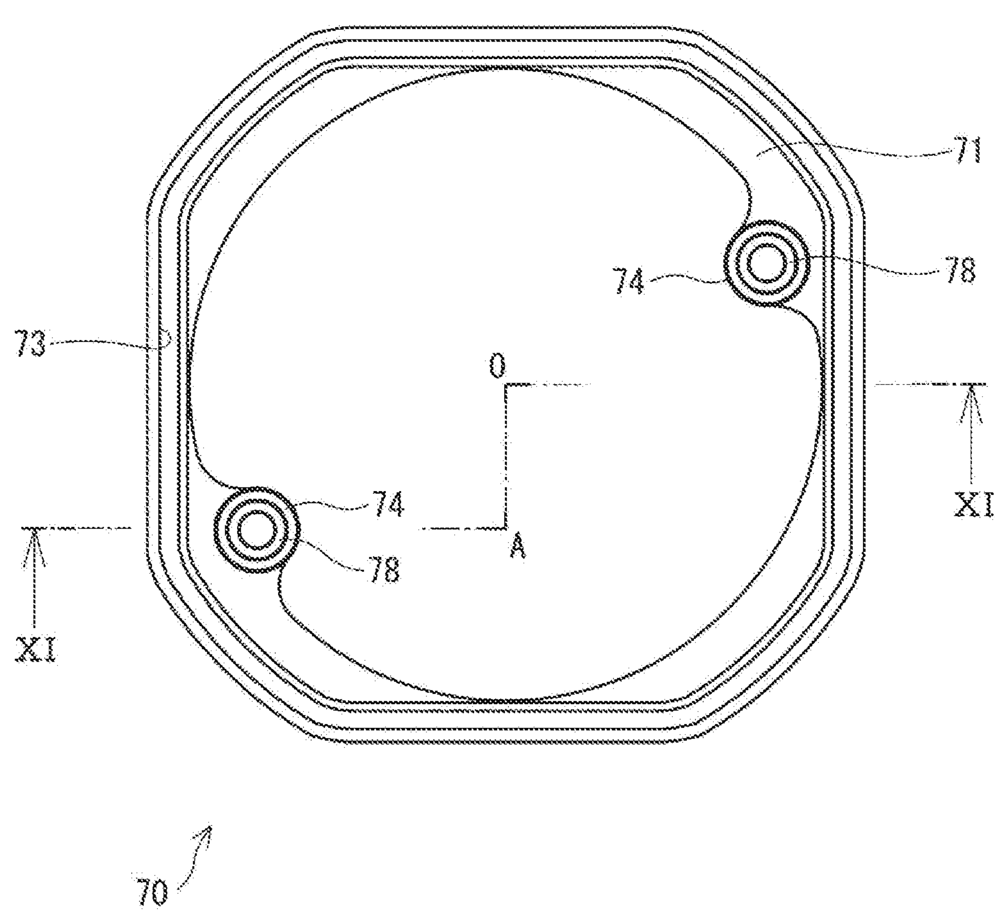
FIG. 10 is a plan view of an extension member according to the first embodiment.
Figure 11:
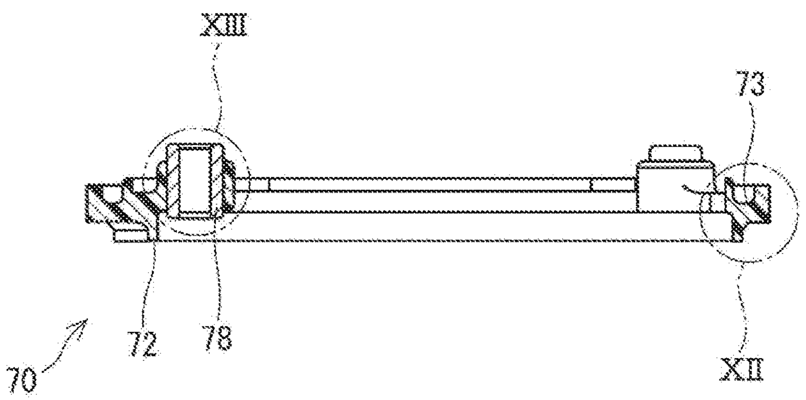
FIG. 11 is a cross-sectional view taken along a line XI-A-O-XI of FIG. 10.
Figure 12:
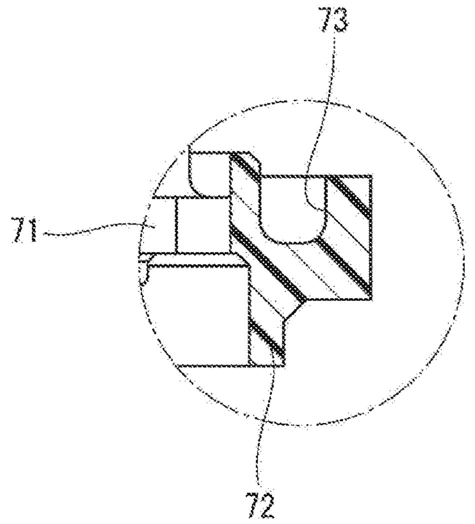
FIG. 12 is an enlarged view of a part XII of FIG. 11.
Figure 13:
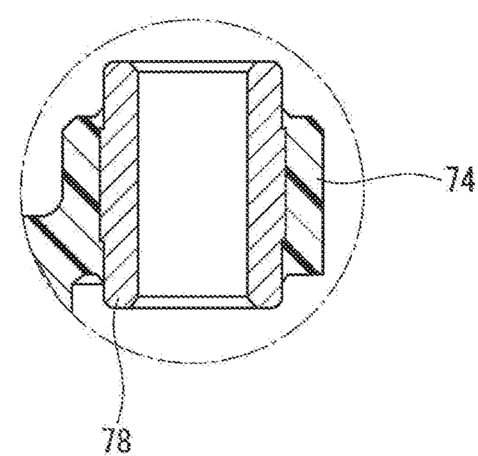
FIG. 13 is an enlarged view of a part XIII of FIG. 11.
Figure 14:
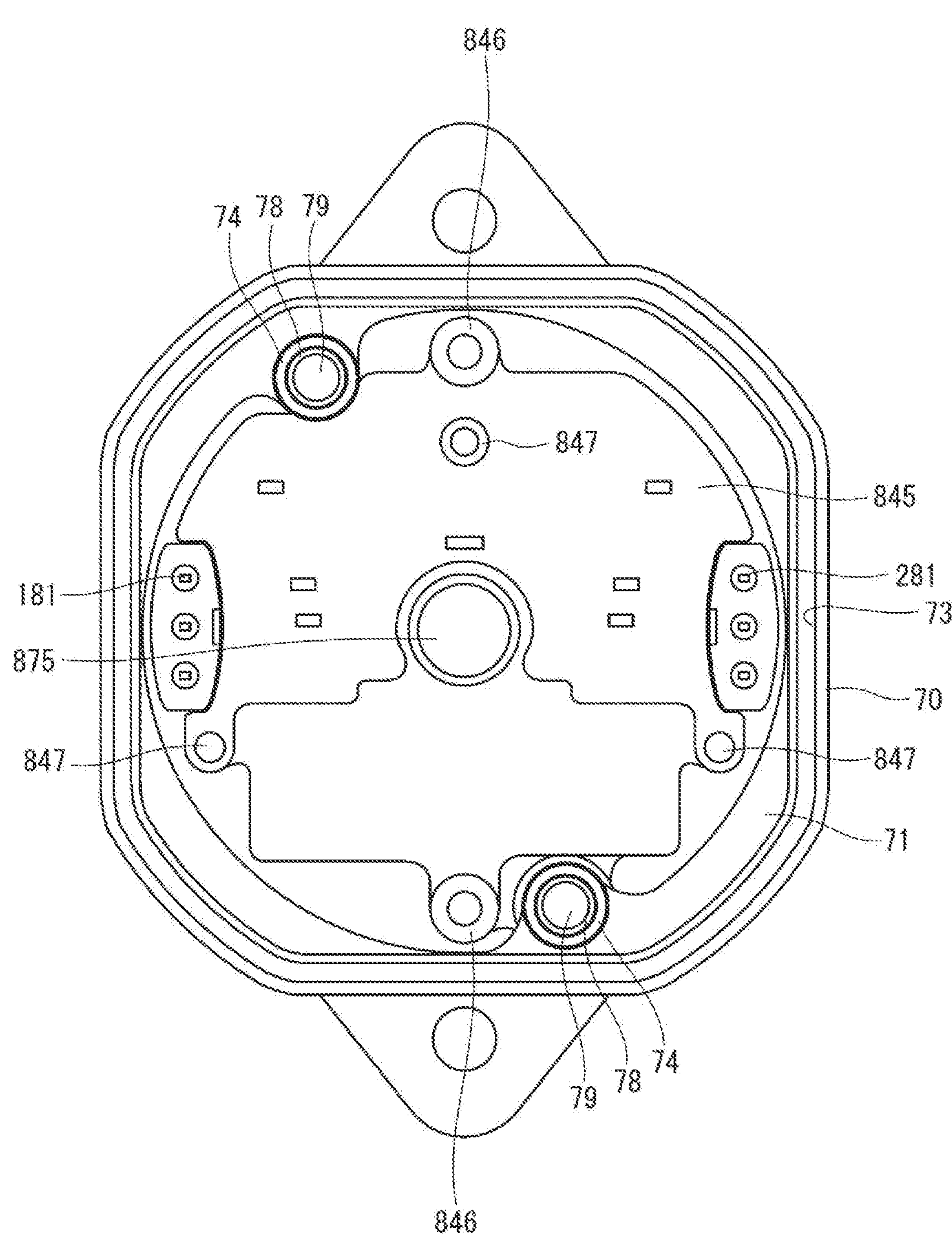
FIG. 14 is a plan view showing a state in which the extension member according to the first embodiment is assembled to a motor case.

As shown in FIG. 1, a drive device 1 includes a motor 80 and an ECU 10, and is applied to an electric power steering device 8 as a steering device, which assists a steering operation of a vehicle. FIG. 1 shows an overall configuration of a steering system 90 including the electric power steering device 8. The steering system 90 includes a steering wheel 91 which is a steering member, a steering shaft 92, a pinion gear 96, a rack shaft 97, road wheels 98 and the electric power steering device 8.

The steering wheel 91 is connected to the steering shaft 92. A torque sensor 93 is provided on the steering shaft 92 to detect a steering torque. The torque sensor 93 is internally divided into two systems, and the detected values trq1 and trq2 of two systems are input to corresponding connectors 153 and 253, respectively. A pinion gear 96 is provided at an axial end of the steering shaft 92. The pinion gear 96 meshes with a rack shaft 97. The pair of wheels 98 is connected to both ends of the rack shaft 97 through tie rods or the like.

When a driver rotates the steering wheel 91, the steering shaft 92 connected to the steering wheel 91 rotates. A rotational movement of the steering shaft 92 is converted into a linear movement of the rack shaft 97 by the pinion gear 96. The pair of road wheels 98 is steered to an angle corresponding to a displacement amount of the rack shaft 97.

The electric power steering device 8 includes a drive device 1, a reduction gear 89 as a power transmission unit that reduces the rotation of the motor 80 and transmits the rotation to the rack shaft 97, and the like. The electric power steering device 8 of the present embodiment is a so-called "rack assist type", but may be a so-called "column assist type" or the like that transmits the rotation of the motor 80 to the steering shaft 92.

As shown in FIGS. 2 to 7, the motor 80 is a three-phase brushless motor. The motor 80 outputs part or all of a torque required for steering, and is driven by a power supplied from a battery (not shown) to rotate the reduction gear 89 forward and backward. The motor 80 has a first motor winding 180 and a second motor winding 280.

Hereinafter, a combination of configurations relating to the energization control of the first motor winding 180 will be referred to as a first system, and a combination of configurations relating to the energization control of the second motor winding 280 will be referred to as a second system. The configuration of a first system L1 is mainly numbered in the 100*s*, the configuration of a second system L2 is mainly numbered in the 200*s*, and the lower 2 digits are substantially the same for the first and second systems. With this numbering of reference numerals, the description will be simplified. As appropriate, an index of "1" is added to a component or a value related to the first system L1, and an index of "2" is added to a component or a value related to the second system L2.

The drive device 1 has the ECU 10 integrally provided on one side of the motor 80 in an axial direction, which is so-called "electromechanical integrated type". The ECU 10 is positioned coaxially with an axis Ax of the shaft 870 on the side opposite to the output shaft of the motor 80. Here, in the meaning "coaxially", errors and deviations related to assembly and design are allowed, for example.

A "mechanical and electrical integration" in the drive device 1 of the present embodiment is different from a structure in which, for example, a substantially rectangular parallelepiped ECU is simply placed close to the motor 80. By adopting the mechanical and electrical integrated type, it may be possible to efficiently position the ECU 10 and the motor 80 in a vehicle having restriction for mounting space. Hereinafter, an axial direction of the motor 80 will be regarded as an axial direction of the drive device 1, and simply referred to as "axial direction".

The motor 80 has a motor case 830, a motor frame 840, a stator 860, a rotor 865, and the like. The stator 860 is fixed to the motor case 830 and has the motor windings 180, 280 wound thereon. The rotor 865 is provided radially inside the stator 860 and is provided rotatably relative to the stator 860.

The shaft 870 is fitted firmly in the rotor 865 to rotate integrally with the rotor 865. The shaft 870 is rotatably supported by the motor case 830 and the motor frame 840 by the bearings 871 and 872. An end portion of the shaft 870 on the side of the ECU 10 is inserted through a shaft hole 849 formed in the motor frame 840 and exposed to the side of the ECU 10. A magnet 875 is placed at the end of the shaft 870 on the ECU 10 side.

The motor case 830 is formed in a substantially bottomed tubular shape including a bottom portion 831 and a cylindrical portion 832, and the ECU 10 is provided on an opening side. The bearing 871 is provided on the bottom portion 831. The stator 860 is fixed to the cylindrical portion 832.

The motor frame 840 has a frame portion 841, a heat sink 845, a connector connecting portion 846, and the like, and is made of a material with good thermal conductivity such as aluminum. The frame portion 841 is press-fitted radially inward of the motor case 830, and as a whole is within a projected area (hereinafter referred to as "motor silhouette" as appropriate) obtained by projecting the cylindrical portion 832 of the motor case 830 in the axial direction. A flange portion 842 is formed on the outer circumference of the frame portion 841 and contacts a stepped portion 833 formed on the inner wall of the cylindrical portion 832. An extension member connection portion 843 is formed outside the heat sink 845 of the frame portion 841.

The heat sink 845 is erected on the ECU 10 side of the frame portion 841. The heat sink 845 is formed in a substantially rectangular shape in plan view within the motor silhouette. Motor wire extraction holes are formed on both sides of the frame portion 841 sandwiching the heat sink 845. Insulating members are provided in the motor wire extraction holes, and recesses are formed in the side surfaces of the heat sink 845 at locations where the motor windings 180 and 280 are extracted. One ends of the motor windings 180 and 280 are taken out to the ECU 10 side while being insulated from the motor frame 840. The motor windings 180 and 280 are connected to a main board 31.

The connector connection portion 846 is erected substantially in a center of the side surface of the heat sink 845 from which the motor windings 180 and 280 are not taken out. A height of the connector connection portion 846 is higher than the heat sink 845.

The ECU 10 has the main board 31, a sub board 32, power connection parts 141, 241, signal system connection parts 146, 246, a connector unit 50, a cover 60, and the like. The main board 31 is fixed by screws 319 to a board fixing portion 847 (see FIG. 14) of the heat sink 845. The sub board 32 is fixed to the connector unit 50. The main and sub boards 31 and 32 are larger than the heat sink 845 when projected in the axial direction, and are formed to extend to the outside of the heat sink 845.

On a surface of the main board 31 on the side of the heat sink 845, switching elements, a microcomputer, and the like, which constitute an inverter, are mounted, and are provided to the heat sink 845 so as to be capable of dissipating heat. Components such as capacitors are mounted on a surface of the main board 31 opposite to the motor 80. Some of the elements mounted on the main and sub boards 31 and 32 are omitted. The main board 31 is formed with relief recesses 316 for avoiding interference with the connector connecting portion 846.

Components such as a choke coil and a capacitor that constitute a filter circuit are mounted on the sub board 32. The sub board 32 is formed with relief recesses 326 for avoiding interference with a fixing portion 516 of the connector unit 50, which will be described later. In the present embodiment, the main and sub boards 31 and 32 are hollowed out to form relief recesses 316 and 326 to directly connect the connector unit 50 to the motor frame 840.

The main board 31 and the sub board 32 are connected by power connection parts 141 and 241 and signal system connection parts 146 and 246. The first power connection part 141 has power terminals 142, a terminal holding portion 143 and pins 144. There are two power terminals 142, one of which is a power terminal and the other is a ground terminal. The power terminal 142 is held by the terminal holding portion 143 and has one end connected to the main board 31 and the other end connected to the sub board 32. The pins 144 are provided so as to protrude toward the main board 31 on both sides of the terminal holding portion 143, and are fixed to the main board 31 to position the first power connection part 141. The second power connection part 241 has power terminals 242, a terminal holding portions 243 and pins 244.

The power connection parts 141 and 241 are arranged on both sides of the relief recesses 316 and 326 along the same side in an outer area outside the area where various elements such as switching elements are mounted. The power connection parts 141 and 241 are arranged line-symmetrically with respect to a center line C of the board.

The first signal connection part 146 has a plurality of signal terminals 147, a terminal holding portion 148 and pins 149. The signal terminal 147 is held by the terminal holding portion 148 and has one end connected to the main board 31 and the other end connected to the sub board 32. The pins 149 are provided so as to protrude toward the main board 31 on both sides of the terminal holding portion 148, and are fixed to the main board 31 to position the first signal connection part 146. The second signal connection part 246 has a plurality of signal terminals 247, a terminal holding portion 248 and pins 249. The signal terminals 147 and 247 are used for signal transmission between the torque sensor 93 and a vehicle communication network 99. The number of terminals can be arbitrarily set according to the number of signals and the like.

The signal connection parts 146 and 246 are arranged along the side opposite to the side where the power connection parts 141 and 241 and provided on both sides of the relief recesses 316 and 326 in an outer area outside the area where various elements are mounted. The signal connection parts 146 and 246 are arranged line-symmetrically with respect to the center line C of the board.

The connector unit 50 has a base portion 51, vehicle connectors 152 and 252, and steering connectors 153 and 253. The base portion 51 is formed in a substantially rectangular shape in a plan view. A groove portion 511 is formed along the outer edge of the surface of the base portion 51 opposite to the motor 80. The fixing portions 516 are formed on the base portion 51. A through bolt 519 is inserted through the fixing portion 516 and screwed to the connector connection portion 846 of the motor frame 840. The connector unit 50 is thereby fixed to the motor frame 840. A connection position in the axial direction between the connector connecting portion 846 of the motor frame 840 and the fixing portion 516 of the connector unit 50 is between the main board 31 and the sub board 32.

The connectors 152, 153, 252, and 253 are formed with frontage facing outward in the axial direction. The vehicle connectors 152 and 252 are integrated hybrid connectors in which a power connector connected to a vehicle power supply and ground (not shown) and a communication connector connected to a vehicle communication network 99 (see FIG. 1) such as CAN (Controller Area Network) are integrated. The steering connectors 153 and 253 are connected to the torque sensor 93. In FIG. 1, the vehicle communication network 99 is indicated as "CAN".

The cover 60 is formed in a substantially cylindrical shape with a bottom, and accommodates the main and sub boards 31 and 32, the heat sink 845 and the like inside. A substantially rectangular hole 61 is formed at a bottom of the cover 60. The connectors 152, 153, 252, and 253 are inserted through the holes 61. An end portion 611 of the hole 61 is bent inward. The end portion 611 is inserted into the groove portion 511 of the connector unit 50, and an adhesive member such as an adhesive is coated on the groove portion 511. As a result, it is possible to prevent water droplets and dust from entering between the connector unit 50 and the cover 60.

In the present embodiment, four frontages are provided for the vehicle connectors 152, 252 and the steering connectors 153, 253, and the frontage area is large. Therefore, in the present embodiment, by providing an extension member 70 having four corners projecting from the motor silhouette, the area outside the motor silhouette can be used.

As shown in FIGS. 8 to 14, the extension member 70 has a base portion 71, an annular convex portion 72, a cover insertion groove 73, a fixing portion 74, etc., and is integrally formed of resin or the like. The extension member 70 is formed in an annular shape as a whole, and is arranged on the ECU 10 side of the frame portion 841 of the motor frame 840 and radially outside the heat sink 845. In other words, the heat sink 845 is formed on the inner peripheral side of the extension member 70 so as to protrude toward the ECU 10 side. At least part of the outer edge of the extension member 70 is located outside the motor silhouette.

The annular convex portion 72 is provided on the surface of the base portion 71 on the side of the motor 80 so as to protrude along the inner peripheral surface of the motor 80, and is inserted into the cylindrical portion 832 of the motor case 830. By inserting the annular convex portion 72 into the cylindrical portion 832 in a state in which an adhesive member such as an adhesive is applied to the stepped portion 833 of the motor case 830, intrusion of water droplets, dust, etc. from between the motor case 830 and the extension member 70 can be prevented.

The cover insertion groove 73 is formed along the outer edge of the surface of the extension member 70 opposite to the motor 80. A flange portion 66 is formed on the cylindrical portion 65 of the cover 60, and a distal end side of the cylindrical portion 65 relative to the flange portion 66 is inserted into the cover insertion groove 73 coated with an adhesive member such as an adhesive. As a result, entry of water droplets, dust, etc. from between the expansion member 70 and the cover 60 can be prevented. The fixing portion 74 is formed to protrude radially inward from an inner peripheral wall of the extension member 70. A collar 78 is inserted into the fixing portion 74 and fixed to the frame portion 841 with a screw 79.

Assembly of the drive device 1 will be described. First, the extension member 70 is assembled to the motor assembly in which the motor frame 840 is attached to the motor case 830 and fixed to the motor frame 840 with the screws 79.

Next, the main board 31 with the connection parts 141, 146, 241, and 246 assembled is fixed to the motor frame 840 with screws 319. At this time, a heat dissipating gel is appropriately applied to a portion where heat is to be dissipated by the heat sink 845. Next, the connector unit 50 to which the sub board 32 is assembled is fixed to the motor frame 840 with the through bolts 519, and finally the cover 60 is put on.

As described above, the drive device 1 includes the motor 80, the motor frame 840, the ECU 10, the extension member 70, and the cover 60. The motor 80 includes the motor case 830 having the cylindrical portion 832, the stator 860 fixed to the motor case 830, the motor windings 180 and 280 wound around the stator 860, the rotor 865 provided rotatably relative to the stator 860, and the shaft 870 that rotates integrally with the rotor 865. The motor frame 840 is provided on one side of the cylindrical portion 832 in the axial direction.

The ECU 10 has at least one board 31, 32 on which electronic components related to energization control of the motor windings 180, 280 are mounted and a connector unit 50, and is arranged on one side of the motor 80 in the axial direction. The connector unit 50 has at least one connector 152, 153, 252, and 253 erected from the base portion 51 with a frontage facing outward in the axial direction of the motor 80.

The extension member 70 is fixed to the motor case 830. The cover 60 has holes 61 through which the connectors 152, 153, 252, and 253 are inserted, and is fixed to the extension member 70. The boards 31 and 32 and the extension member 70 are formed to extend to the outside of the projected area in which the cylindrical portion 832 of the motor case 830 is projected in the axial direction.

In the present embodiment, by providing the extension member 70, since the ECU 10 can be extended to the outside of the motor silhouette, a large mounting area for the boards 31 and 32 and a large frontage area for the connectors 152, 153, 252, and 253 can be secured, as compared with the case where the extension member 70 is not provided. As a result, it is possible to increase the degree of freedom in designing the boards and the connectors.

The drive device 1 is applied to the electric power steering device 8. The connectors include the power connector connected to the power supply, the communication connector connected to the vehicle communication network 99, and the steering connectors 153, 253 for acquiring a signal from the torque sensor 93, which is an internal sensor of the electric power steering device 8. In the present embodiment, the vehicle connectors 152, 252 are integrated with the power connector and the communication connector, but the power connector and the communication connector may be separated.

A plurality of motor windings 180, 280 (two pairs in the present embodiment) are provided. When the configuration corresponding to each of the motor windings 180, 280 is defined as a system, the vehicle connectors 152, 252 and the steering connectors 153, 253 are provided for each system. Moreover, the steering connectors 153, 253 are provided independently of the vehicle connectors 152, 252.

In the present embodiment, the frontage area can be ensured by providing the extension member 70. Therefore, the steering connectors 153, 253 used for connection inside the electric power steering device 8 and the vehicle connectors 152, 252 used for connection with the outside of the electric power steering device 8 are separately provided for each system.

The boards include the main board 31 fixed to the motor frame 840 and the sub board 32 fixed to the connector unit 50. The main board 31 and the sub board 32 are connected outside the element mounting area by the power connection parts 141, 241 having the power terminals 142, 242, which is a power terminal and a ground terminal and the signal connection parts 146, 246 having a plurality of signal terminals 147, 247. In the present embodiment, by providing two boards 31 and 32, a large mounting area can be secured. In addition, by connecting the boards 31 and 32 outside the element mounting area where various electronic parts are mounted using the power connection parts 141 and 241 and the signal connection parts 146 and 246, a large element mounting area of the boards 31 and 32 can be secured.

The motor frame 840 is provided with the connector connecting portion 846 erected on the side of the ECU 10 inside the extension member 70. The connector unit 50 is provided with the fixing portion 516 extending toward the motor 80 side. The main board 31 is formed with the relief recess 316 in which the connector connecting portion 846 is arranged. The sub board 32 is formed with the relief recess 326 in which the fixing portion 516 is arranged. The motor frame 840 and the connector unit 50 are fixed at an intermediate position between the main board 31 and the sub board 32 in the axial direction. As a result, the connector unit 50 can be appropriately fixed to the motor frame 840 while securing a large mounting area for the boards 31 and 32.

The motor frame 840 has the frame portion 841 arranged radially inward of the cylindrical portion 832 and the heat sink 845 erected from the frame portion 841 toward the ECU 10 and to which the main board 31 is fixed. The extension member 70 is arranged outside the heat sink 845 formed in an annular shape, and is fixed to the frame portion 841. Thereby, the extension member 70 is properly fixed to the motor frame 840. At least part of the heat of the electronic components mounted on the main board 31 can be dissipated to the heat sink 845 side.

In the present embodiment, the electric power steering device 8 corresponds to “steering device”, the ECU 10 corresponds to “control unit”, the main board 31 and the sub board 32 correspond to “board”, the vehicle connectors 152 and 252 correspond to “power connector” and “communication connector”, the steering connectors 153 and 253 correspond to “connector”, the torque sensor 93 corresponds to “internal sensor”, the relief recess 316 corresponds to “main relief recess”, and the relief recess 326 corresponds to “sub relief recess”. Here, in order to distinguish between the two boards, the terms “main” and “sub” are used for the sake of convenience, but it does not necessarily have to be a main/sub relationship functionally.

Second Embodiment

Figure 15:
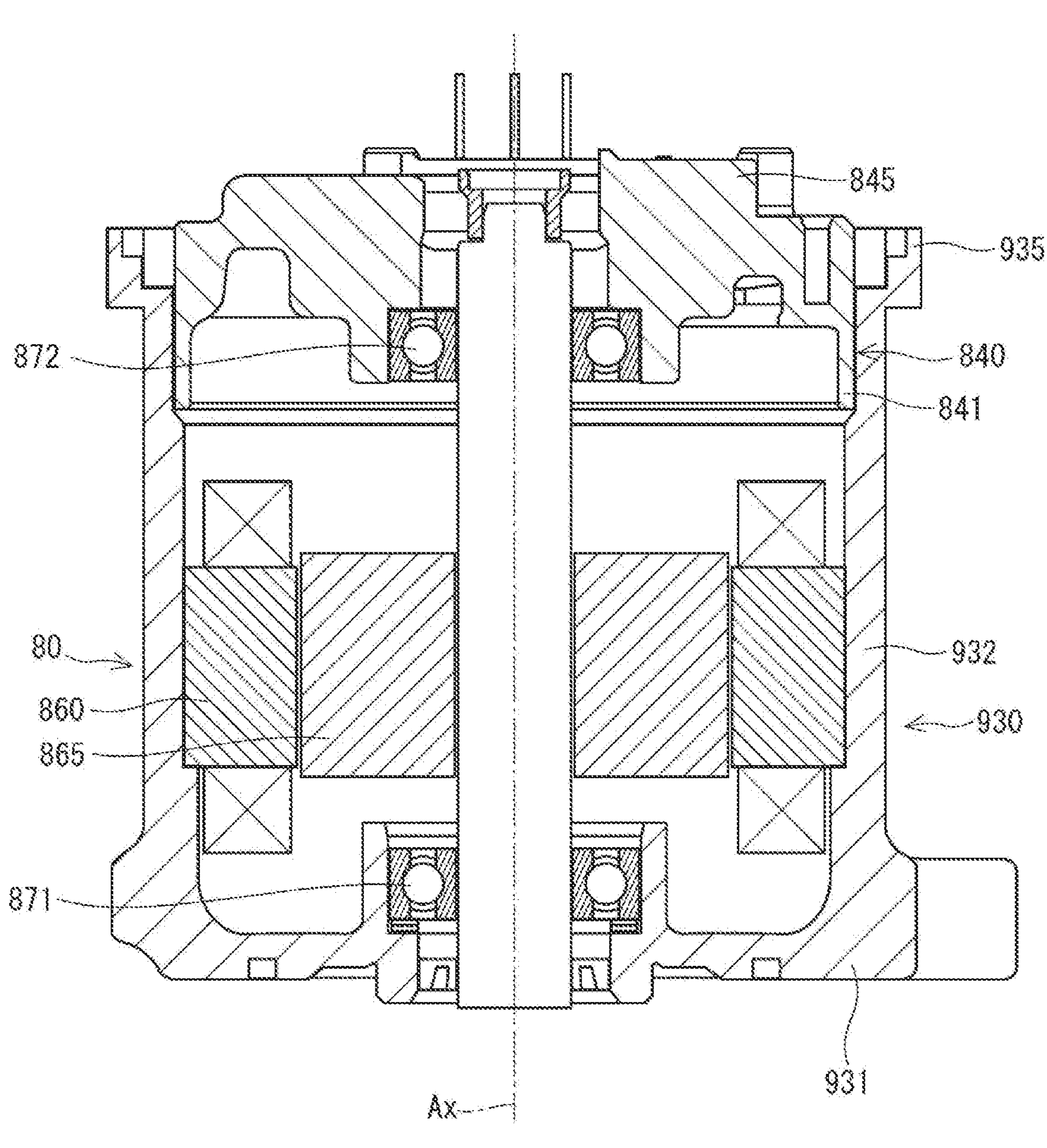
FIG. 15 is a cross-sectional view showing a motor and a motor frame according to a second embodiment.

A second embodiment is shown in FIG. 15. In the present embodiment, a motor case 930 is mainly different from the above embodiment, so this point will be mainly described. The motor case 930 is formed in a substantially bottomed tubular shape including a bottom portion 931 and a cylindrical portion 932, and the ECU 10 (not shown in FIG. 15) is provided on the opening side. The bearing 871 is provided on the bottom portion 931. The stator 860 is fixed to the cylindrical portion 932. In the present embodiment, an extension portion 935 as an extension member is integrally provided on the opening side of the cylindrical portion 932.

This configuration also achieves the same effects as those of the embodiment described above.

Other Embodiments

In the above embodiments, the power connector connected to the vehicle power supply and ground and the communication connector connected to the vehicle communication network are integrated. In other embodiments, the power connector and the communication connector may be separate. Also, the type and number of connectors can be set arbitrarily, and the frontages may be provided separately, or may be provided in any combination. Further, in the above-described embodiments, the connector frontage is provided separately for each system. In other embodiments, one frontage may be shared by a plurality of systems without dividing the connector frontages by system.

In the above embodiments, the torque sensor corresponds to the internal sensor. In other embodiments, the sensor is not limited to the torque sensor, and may be, for example, a steering sensor, as long as the sensor is outside the ECU and inside the steering system.

In the above embodiment, two sets of motor windings are provided, and the number of systems is two. As other embodiments, the number of systems may be one, three or more. In the above embodiments, the connector is provided for each system. In other embodiments, the system and connector may not correspond.

In the above embodiments, two boards, a main board and a sub board, are provided. In other embodiments, the number of boards may be one or three or more, and at least one board should be formed to extend outside the motor silhouette.

In the above embodiments, the steering device is the electric power steering device. In other embodiments, the steering device may be a steer-by-wire device, and the drive device may be used as a steering device for steering the wheels or as a reaction force device for applying a reaction force to the steering wheel. Also, the drive device may be applied to devices other than the steering device. The present disclosure is not limited to the embodiment described above but various modifications may be made within the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A drive device, comprising:

a motor including a motor case having a cylindrical portion, a stator fixed to the motor case, a motor winding wound around the stator, a rotor provided rotatably relative to the stator, and a shaft configured to rotate integrally with the rotor;

a motor frame provided on one side of the cylindrical portion in an axial direction;

a control unit including at least one board on which electronic component related to energization control to the motor winding is mounted, and a connector unit in which at least one connector having a frontage facing axially outward of the motor is erected from a base portion, and being arranged on one side of the motor in the axial direction;

an extension member secured to the motor case and the motor frame; and a cover having a hole through which the connector is inserted and fixed to the extension member;

wherein the extension member is formed to extend to an outside of a projection area obtained by projecting the cylindrical portion of the motor case in the axial direction, the motor frame has a frame portion arranged radially inward of the cylindrical portion and a heat sink erected from the frame portion toward the control unit, no portion of the motor frame extends radially outward beyond the projection area obtained by projecting the cylindrical portion of the motor case in the axial direction, the extension member is annularly formed and arranged outside the heat sink, and at least one of the board and the connector unit is arranged in a region within a projection area of the extension member in the axial direction and outside the projection area of the cylindrical portion of the motor case.

2. The drive device according to claim 1, wherein the drive device is applied to a vehicle steering device, the connector includes a power connector connected to a power supply, a communication connector connected to a vehicle communication network, and a steering connector configured to acquire a signal from an internal sensor of the vehicle steering device, when a plurality of motor windings are provided, and a configuration corresponding to the motor winding is defined as system, the power connector, the communication connector and the steering connector are provided for each system, and the steering connector is provided independently of the power connector and the communication connector.

3. The drive device according to claim 1, wherein the board includes a main board fixed to the motor frame and a sub board fixed to the connector unit, the main board and the sub board are connected outside an element mounting area by a power connection part having power terminals, which is a power terminal and a ground terminal and a signal connection parts having a plurality of signal terminals.

4. The drive device according to claim 3, wherein the motor frame having a connector connecting portion erected on a side of the control unit inside the extension member, the connector unit having a fixing portion extending toward the motor side, the main board is formed with a relief recess in which the connector connecting portion is arranged, the sub board is formed with a relief recess in which the fixing portion is arranged, and the motor frame and the connector unit are fixed at an intermediate position between the main board and the sub board.

5. The drive device according to claim 3, wherein the main board is fixed to the heat sink.

6. The drive device according to claim 1, wherein the extension member is made of resin.

7. The drive device according to claim 1, wherein the extension member comprises a through hole within which the heat sink is arranged.

8. The drive device according to claim 1, wherein the extension member and the motor frame overlap along a plane that is perpendicular to the axial direction.

9. The drive device according to claim 1, wherein a portion of the control unit extends to the outside of a projection area obtained by projecting the cylindrical portion of the motor case in the axial direction.

* * * * *